June 22, 1937.  D. C. DRILL  2,084,896
SELF CLEANING SCREEN APPARATUS
Filed July 5, 1935  2 Sheets-Sheet 1
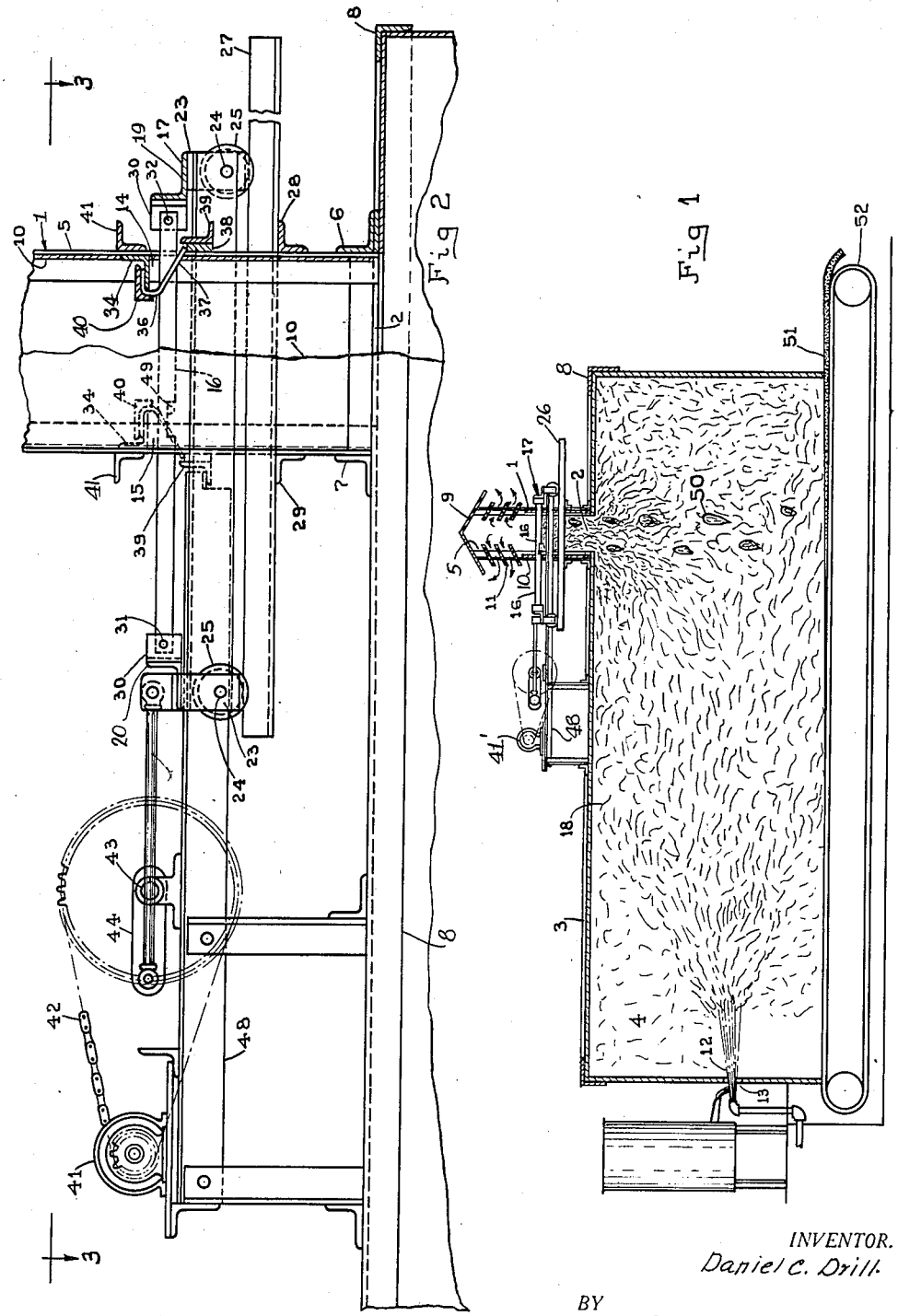
INVENTOR.
Daniel C. Drill.
BY
Carlton C. Davis
ATTORNEY.

June 22, 1937.  D. C. DRILL  2,084,896
SELF CLEANING SCREEN APPARATUS
Filed July 5, 1935  2 Sheets-Sheet 2
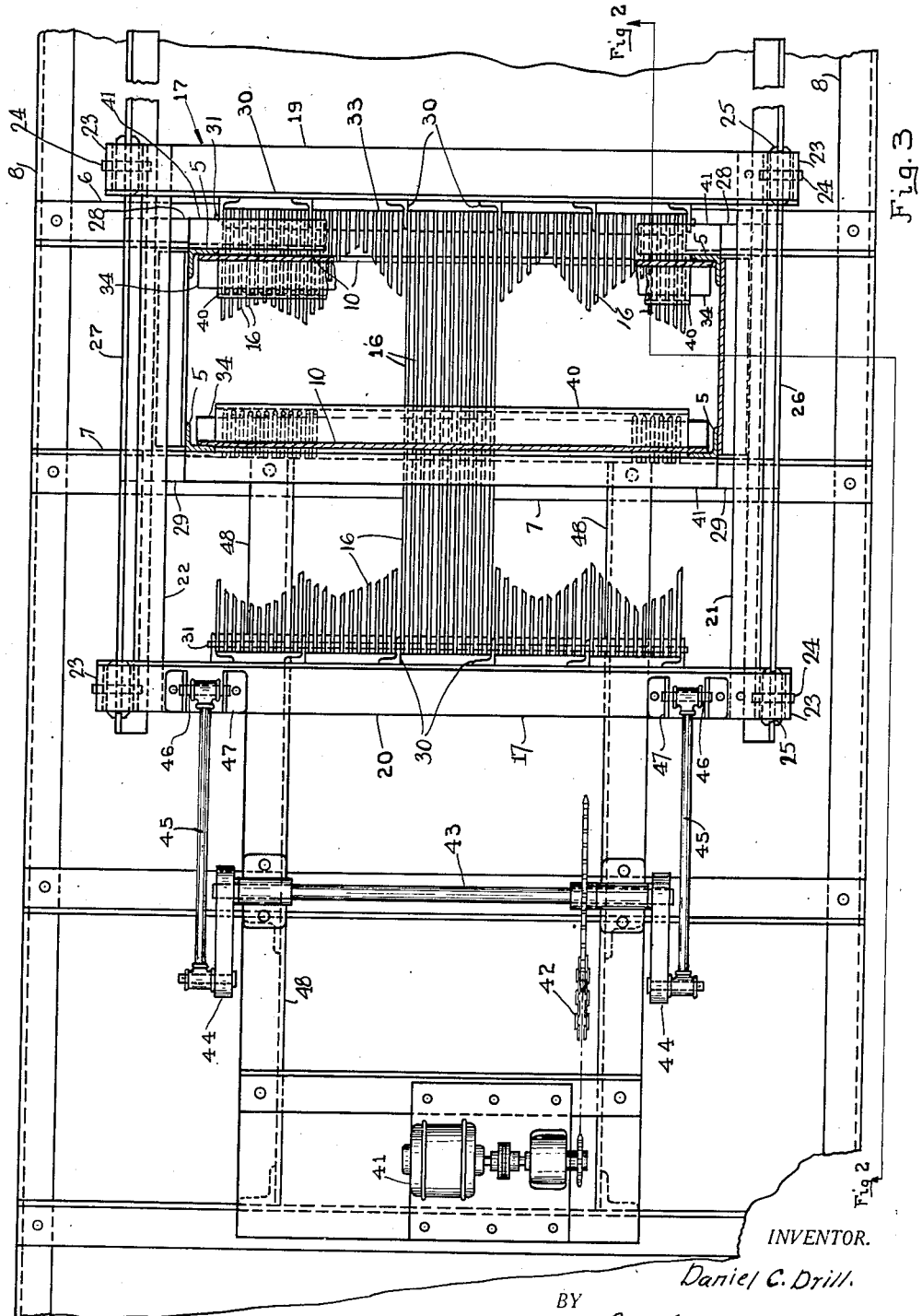
INVENTOR.
Daniel C. Drill.
BY Carlton C. Davis
ATTORNEY.

Patented June 22, 1937

2,084,896

UNITED STATES PATENT OFFICE 2,084,896

SELF-CLEANING SCREEN APPARATUS

Daniel C. Drill, Wabash, Ind., assignor to American Rock Wool Corporation, Wabash County, Ind.

Application July 5, 1935, Serial No. 29,943

5 Claims. (Cl. 183—44)

This invention relates to a self-cleaning screen apparatus.

The main object of my invention is to provide a screen apparatus which is self-cleaning.

A more specific object is the provision of apparatus whereby mineral wool may be prevented from escaping from the settling chambers of mineral wool plants.

Mineral wool is now produced by melting any suitable material, such as wool rock, or slag, and subjecting the molten material to a steam or air blast which shreds the material into fibers which are used chiefly for insulation and filtering purposes. The molten material is shot by the blast into a settling or blow chamber which is necessarily provided with a ventilator through which the heated gases and vapors pass out of the chamber.

Heretofore, the vapors passing through the ventilator have carried with them an appreciable proportion of the mineral fibers produced. The fibers thus lost are scattered by the winds and deposited in the adjacent territory. The lost wool may be 5% or more of the amount produced and is of the best grade of wool manufactured. The scattering of this wool not only causes the mineral wool plant to be a nuisance in this respect, but also entails a substantial loss.

Numerous efforts have been made, of course, to prevent the mineral wool from passing out through the ventilator but, insofar as applicant is aware, no satisfactory apparatus or method has heretofore been discovered to prevent it.

The difficulty lies in the fact that the wool is inherently tacky, and that a binder such as oil or asphalt or rosin is usually added to the molten blast before it enters the chamber. The binders, of course, increase the tendency of the wool to adhere to and felt over any screen.

In the application of my invention, I provide a plurality of spaced-apart parallel screen members, in combination with comb means whereby the adhering fibers may be removed from these members.

The full nature of my invention and its other objects may be understood from the following drawings, description and claims.

In the drawings:

Figure 1 is a partly diagrammatic and partly sectional view of a cupola and blow chamber of a mineral wool plant, on the roof of the chamber of which a device embodying my invention is installed, Figure 2 is a section taken along the line 2—2 of Figure 3, and Figure 3 is a horizontal sectional view taken substantially along the line 3—3 of Figure 2, certain portions being shown broken away.

In carrying out my invention, I make use of any suitable ventilator housing 1, which for the purpose of illustration is depicted as covering a vent 2 in a roof 3 of a mineral wool blow chamber 4.

This housing may be provided with upright frame members 5, which are welded or otherwise fixedly secured to suitably spaced angle bars 6 and 7 which are supported at either end by the upper portion of a blow chamber frame 8.

The ventilator housing 1 is provided with a roof 9 and a wall 10, the latter of which is louvered at 11 to permit the passage of the heated vapor and gases which are carried into the blow chamber with a steam driven molten blast 12. The blast 12 is hurled through an open portion 13 of the blow chamber 4 against relatively still gases within the blow chamber at such a velocity that the molten material is shredded into mineral wool fibers.

The wall portion 10 is provided with oppositely positioned transversely extending slots 14 and 15 for the purpose of permitting a plurality of screen bars 16 to move horizontally through the ventilator housing 1. The screen bars 16 may be spaced apart any suitable distance, such as, for instance, one-eighth of an inch, to prevent the fibers from passing upwardly with the heated vapors and gases. These bars 16 lie parallel to each other and are secured at either end to a screen frame 17. This frame may be constructed of two oppositely positioned transversely extending angle bars 19, 20 and two longitudinally extending angle bars 21 and 22. The bars 19 and 20 are preferably bolted to bars 21 and 22, through short angle bars 23. The bars 21 and 22 and the bars 23 adapted in any suitable manner are to receive roller shafts 24 which carry grooved rollers 25. These rollers 25 move upon a track consisting of two parallel bars 26 and 27, which are fixedly secured to angle bars 28 and 29. The angle bars 28 and 29 are bolted, or otherwise secured to the vertically extending frame members 5 of the housing 1.

Fixedly secured to the inner walls of the angle bars 19 and 20 are a plurality of perforated brackets 30 through which are threaded transversely extending rods 31. The rods 31 pass through openings 32 which are provided at either end of screen bars 16 and secure these bars to the frame 17 substantially as shown.

The bars 16 are separated by washers 33 which may be threaded on the rods 31.

Two oppositely disposed angle bars 34 are mounted on the frame members 5 above the slots 14 and 15, and support a plurality of somewhat V-shaped rods 36, the lower portions 37 of which pass between the screen bars 16. It will be observed that the lower portions 37 extend downwardly and outwardly and that their extreme end portions rest upon a bar 38 which is backed by an angle bar 39 in such a manner as to provide a stop for the lower end portions of the rods 36.

The bars 38 and 39 are fixedly secured in any suitable manner (not shown) to the frame members 5. Referring to Figure 2 it will be seen that the upper portions of the V-shaped rods 36 are held in position by bars 40 which are clampingly secured to bars 34 by a plurality of bolts (not shown). These bolts may also serve as spacers to the rods 36.

The bars 34 are preferably provided with stiffening bars 41 to which they may be bolted through the frame members 5.

The frame 17 carrying the screen bars 16 is adapted to move horizontally to and fro with power supplied by an electric motor 41'. The motor 41' is coupled by a chain drive 42 to a crank shaft 43. The crank shaft 43 is provided with crank bars 44 which are movably connected to connecting rods 45. The rods 45 are operatively connected to the frame 17 through shafts 46 and bearings 47.

The motor 41' and its associated crank mechanism may be supported by any suitable means such as, for instance, a frame 48 which is fixedly mounted on the frame 8 of the blow chamber.

From the foregoing description of the various parts of my invention its operation may be fully understood.

A considerable portion of the fibers 18 are drawn by the rising heated gases and vapors up against the lower edges of the screen bars 16. The vapors pass readily through the spaces between these bars but the fibers are intercepted by these bars and cling tenaciously to the lower side of these bars and would rapidly form, if the screen bars were stationary, an air-tight blanket which would prevent the gas and vapor from escaping through the ventilator housing.

In operation, however, the screen bars move slowly to and fro. These bars are preferably twice as long as the width of the housing through which they extend and are preferably provided on their lower sides with a centrally disposed cutaway portion 49. As the bars 16 move slowly to and fro the mineral wool fibers deposited on the bars move against the lower portions 37 of the rods 36 and form bunches, or pads, of fiber 50. These bunches drop, by reason of their weight, upon the batt 51, which is forming on the surface of the blow chamber conveyor 52. The fallen bunches of wool become intermingled and incorporated with the batt as it forms. These bunches are formed of the best and lightest grade of fiber which is produced in the blow chamber and are almost without exception free of "shot". The bunches, therefore, not only add to the amount of the wool available for the batt 51, but makes it a batt of superior quality.

Under certain operating conditions, such as when an excessively large amount of binding material is mixed with the fibers or when the deposit of fibers on the screen is very thin, the bunched fibers may adhere to the lowermost edge portions of the screen bars 16 until they are entirely pushed off the inner ends of the lowermost edge portions which terminate at the cutaway portions 49.

Many changes may be made in the above construction without departing from the scope of my invention, the essence of which is the movably mounted bars provided with combing or scraping means. For instance, the screen bars obviously may be designed to cover any suitable vent and may be adapted to be moved vertically as well as horizontally. It is therefore apparent that all matter contained in the above description, or shown in the accompanying drawings, should be interpreted as illustrative, and not in a limiting sense.

I claim:

1. A self-cleaning screen apparatus of a character adapted to retain mineral wool fibers in a mineral wool settling chamber while permitting the passage of the exhaust gases therefrom, said screen apparatus including a ventilator housing having two oppositely positioned slotted portions in the walls thereof, a plurality of movably mounted, parallel and spaced-apart screen members extending through the slotted portions, and a stationary comb member having a plurality of fixedly secured teeth inserted between said screen members within said housing.

2. A self-cleaning screen apparatus of a character adapted to retain mineral wool fibers in a mineral wool settling chamber while permitting the passage of the exhaust gases therefrom, said screen apparatus including a ventilator housing having two oppositely positioned slotted portions in the walls thereof, a plurality of movably mounted, parallel and spaced-apart screen members extending entirely through the slotted portions, and a stationary comb member having a plurality of fixedly secured teeth inserted between said screen members within said housing and projecting beyond either side of said screen members.

3. A self-cleaning screen apparatus of a character adapted to retain mineral wool fibers in a mineral wood settling chamber while permitting the passage of the exhaust gases therefrom, said screen apparatus including a ventilator housing having two oppositely positioned slotted portions in the walls thereof, a plurality of movably mounted, parallel and spaced-apart screen members extending through the slotted portions, and a stationary comb member having a plurality of fixedly secured teeth inserted between said screen members within said housing, said screen members extending in a straight line and being of substantially greater length than the distance between said two slotted portions.

4. A self-cleaning screen apparatus of a character adapted to retain mineral wool fibers in a mineral wool chamber and adapted to pass exhaust gases therefrom, said apparatus including a ventilator housing having two oppositely positioned slotted portions in the wall or casing thereof, a plurality of movably mounted spaced-apart bars extending through said slotted portions of said housing, and two spaced-apart comb members, each of said comb members being positioned adjacent one of said slotted portions and being provided with teeth which extend between and beyond either edge of said bars.

5. A self-cleaning screen apparatus of a character adapted to retain mineral wool fibers in a mineral wool chamber and adapted to pass exhaust gases therefrom, said apparatus including a ventilator housing having two oppositely positioned slotted portions in the wall or casing thereof, a plurality of movably mounted spaced-apart bars having a centrally positioned cut-away portion and extending through said slotted portions of said housing, and two spaced-apart comb members, each of said comb members being positioned adjacent one of said slotted portions and being provided with teeth which extend between and beyond either edge of said bars.

DANIEL C. DRILL.